Oct. 13, 1925.  
V. E. CLARK  
1,557,242  
LANDING CHASSIS FOR AIRPLANES  
Filed Dec. 27, 1921  2 Sheets-Sheet 1

Witness.
Elmer E. Freed
A. Bondar

Inventor.
Virginius E. Clark
Ralph H. Chilton
Attorney.

Oct. 13, 1925.  
V. E. CLARK  
LANDING CHASSIS FOR AIRPLANES  
Filed Dec. 27, 1921  
1,557,242  
2 Sheets-Sheet 2

Witness.
Elmer E. Fried
A. Bondar

Inventor.
Virginius E. Clark
By Ralph W. Chilton
Attorney.

Patented Oct. 13, 1925.

1,557,242

UNITED STATES PATENT OFFICE.

VIRGINIUS E. CLARK, OF DAYTON, OHIO, ASSIGNOR TO DAYTON-WRIGHT COMPANY, OF DAYTON, OHIO, A CORPORATION OF DELAWARE.

LANDING CHASSIS FOR AIRPLANES.

Application filed December 27, 1921. Serial No. 524,929.

*To all whom it may concern:*

Be it known that I, VIRGINIUS E. CLARK, a citizen of the United States of America, residing at Dayton, county of Montgomery, and State of Ohio, have invented certain new and useful Improvements in Landing Chassis for Airplanes, of which the following is a full, clear, and exact description.

This invention relates to landing chassis for airplanes and has particular reference to a form of chassis in which all brace wires have been eliminated and the wheel axle itself serves as a bracing strut.

An object of this invention is to eliminate the straight axle or brace which ordinarily extends directly across from one wheel hub to the other and therefore greatly interferes with landing or taking off in a field covered with tall weeds, brushes, etc.

Another object is to provide a shock absorber unit which may have the resilient means attached thereto under the proper tension when said unit is entirely separate from the other parts of the chassis, and which may then be easily and quickly assembled on the chassis without changing the tensioning of the resilient means. By this means all shock absorbers may be wrapped on the bench or be equally tensioned by special wrapping machines and kept in store all ready wrapped for immediate replacement on the planes when desired.

Another object is to provide a chassis of the type mentioned above in which the wheel and shock absorber unit are easily removable without detaching the axle or brace struts.

Another object is to provide that the guide block for the axle may be removed for replacement without disturbing the shock-absorber or wheel.

Further objects and advantages of the present invention will be apparent from the following description, reference being had to the accompanying drawing, wherein a preferred form of embodiment of the present invention is clearly shown.

In the drawings.

In the drawings like or similar characters refer to like or similar parts throughout the several views.

Figure 2:
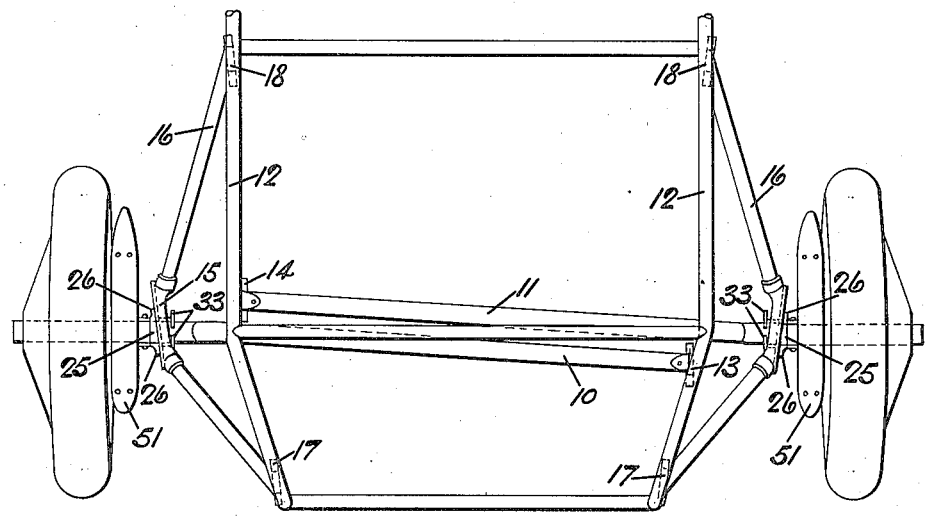
Fig. 2 is a plan view of the landing chassis attached to the bottom members of the fuselage frame.
Figure 3:
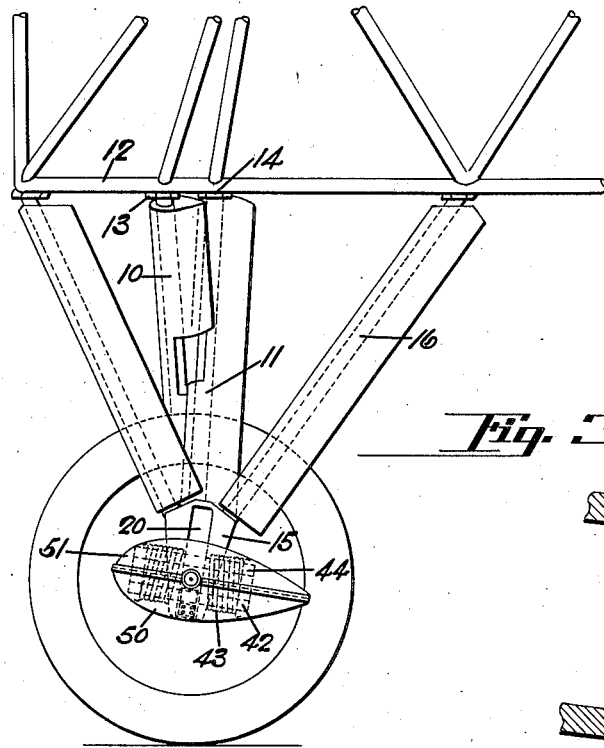
Fig. 3 is a side elevation.
Figure 5:
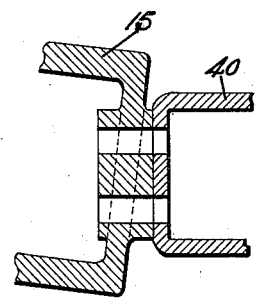
Fig. 5 is a section on line 5—5 of Fig. 4.

In the embodiment shown, the bent wheel axles 10 and 11 are pivoted to the rigid frame 12 of the fuselage at pivot points 13 and 14 respectively. The V-struts 16 which support the lower end of the bent axles in the axle guide fittings 15 are also pivoted to the rigid frame 12 of the fuselage at the front pivot points 17 and the rear pivot points 18. Of course the axes of the two pivot pins 17 and 18 are in the same line to permit free swinging of the V-strut 16 about this line as a center. Since the axes of the pins 17 and 18 is not parallel to the center line of the plane (see Fig. 2) the axle guide fitting 15 moves forward slightly as the V-strut 16 swings upwardly. Therefore, the guide slots 20 in the fittings 15 are inclined at the top slightly toward the rear to permit the wheel axle to ride vertically upward instead of forwardly with the V-strut (see Fig. 3). This permits the pivot pins 13 and 14 to be parallel with the center line of the machine.

Figure 1:
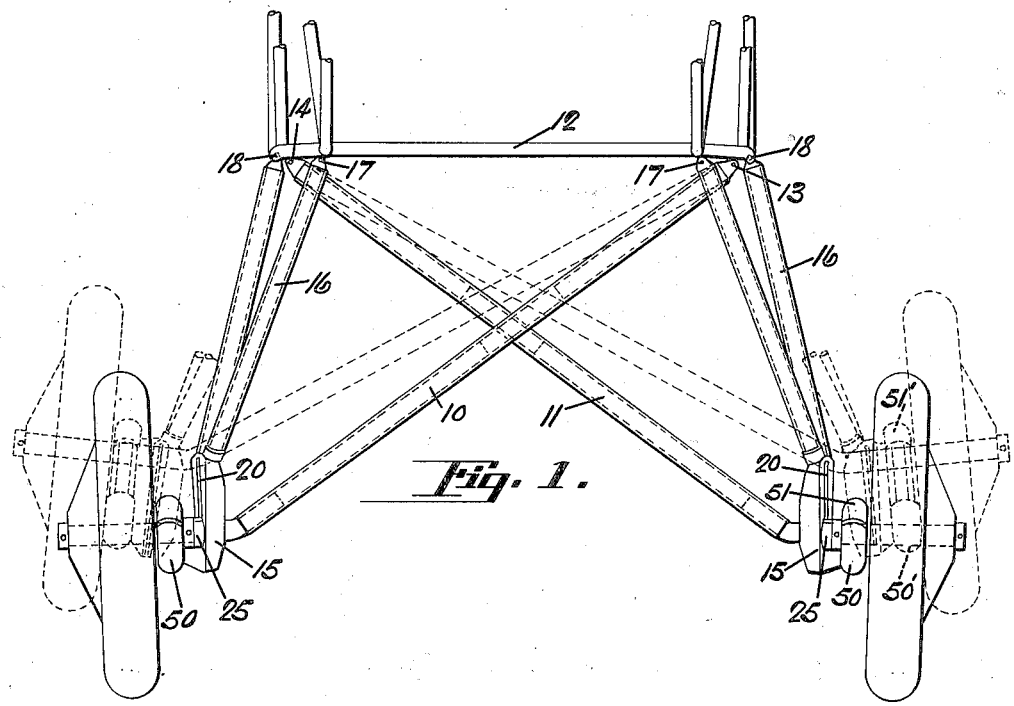
Fig. 1 is a front elevation of a landing chassis illustrating my invention, the dotted lines showing the position the parts take upon shock.
Figure 4:
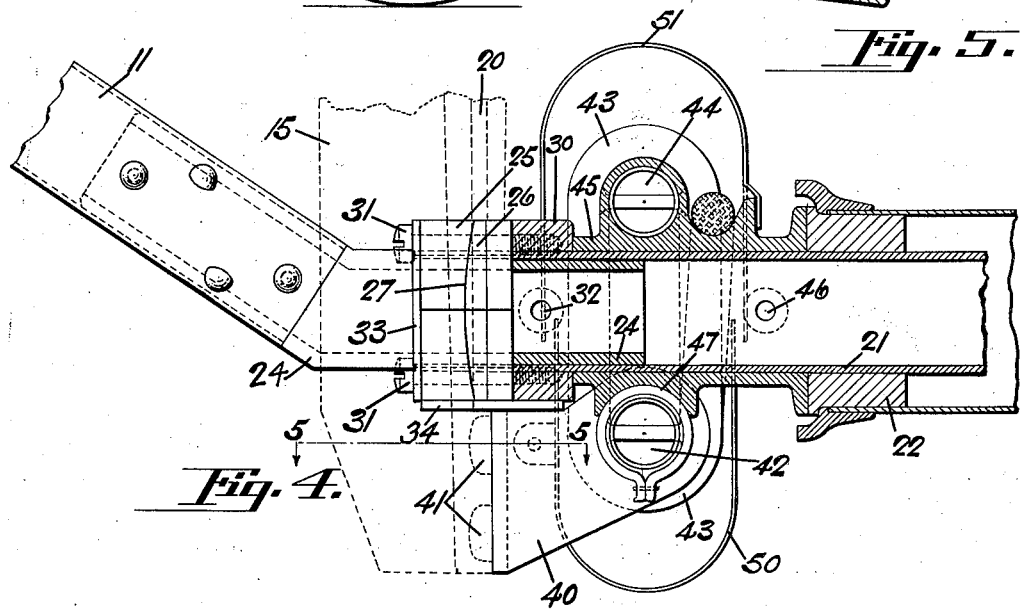
Fig. 4 is a detail view showing a vertical section through the wheel hub and axle and the axle member of the shock absorber unit and showing the axle guide fitting in dotted lines.

Fig. 4 shows the details of construction of the shock absorber and the axle guide bushing for movement within the slot 20. The part of the axle 21 upon which the wheel hub 22 runs preferably is made of different material from the part 11 which acts as a strut member. Therefore, the axle 21 is sweated and riveted with countersunk rivets of the intermediate part 24, which in turn is sweated and riveted to the part 11, as clearly shown in Fig. 4. The axle 21 is provided with a guide bushing 25 which slides up and down within the slot 20 of the guide fitting 15. This guide bushing 25 is provided with flanges 26 having curved faces 27 which bear against the outer face of the guide fitting 15. The curved faces 27 of the flanges 26 roll as well as slide upon the fitting 15 as the axle rides upward in slot 20 to the dotted position shown in Fig. 1. The guide bushing 25 is fixed to the axle by being bolted by tap bolts 31 to the collar 30 which also serves as a spacer and which in turn is pinned or screwed to the axle 21 by means of the pin or screw 32. Preferably the guide bushing 25 is made in upper and lower halves in order that the separate halves may be removed without removing the shock absorber and wheel. These halves are held firmly together on the inner edge by two straps 33 which are also held in place by bolts 31. The straps 33 project over the edges of the slot 20 and perform the additional function of acting as a stop to prevent the V-strut swinging inwardly in the event the shock absorber should break. The guide bushing 25 has preferably secured to its bottom a resilient bumper member 34 which takes the shock of the bushing 25 hitting at the bottom of slot 20.

The shock absorber is made up as a separate and distinct unit which may have the resilient cord wrapped thereon to the desired tension on a bench and then the unit later applied to the chassis in a ready wrapped condition. The lower bracket 40 of the shock absorber unit is fixed to the fitting 15 by means of the bolts 41 (see Fig. 4). This bracket 40 carries rigidly attached thereto the lower bar 42 upon which the elastic cord 43 is wrapped. The upper bar 44 is rigidly secured to a sleeve 45 which is adapted to be slipped over the end of the axle 21 until it abuts the member 30 and then be fixed against rotation on the axle by means of the pin 46. The bottom of sleeve 45 is provided with a seat 47 which fits snugly upon the lower bracket 40 when the axle is resting at the bottom of slot 20. When now it is desired to remove the shock absorber unit without unwrapping the elastic cord it is necessary only to remove pin 46 and the bolts 41 when the bracket 40 and the sleeve 45 held tightly together by means of the tensioned cord 43 can be slipped off the end of axle 21 as a unit. Thus it is seen that wrapped shock absorber units can be kept ready in stock for immediate replacement upon a machine without it being necessary to wrap the cord upon the machine itself.

This invention also permits the use of special machines for wrapping the cord upon the fittings with a constant tension. When shock absorbers are wrapped by hand the desired tension can be only roughly approximated by the number of turns and the length of the cord to be wrapped. Both shock absorbers on a machine are only approximately equally tensioned by making the cords of equal length to start with, since the effective length of the cords cannot be made exactly the same and also there is quite a variation in different lengths of the same piece of cord.

The shock absorber is provided with a bottom fairing 50 which is secured relatively stationary with the lower bar 42 and a top fairing member 51 which is secured relatively stationary with the upper bar 44. The top and bottom members 51 and 50 have a telescoping joint along the center line of the axle to permit easy separation of the two parts upon the landing of the machine.

I have herein illustrated and described a landing chassis wherein the wheel axles also serve as a bracing strut thus reducing the number of struts and eliminating altogether the brace wires and hence greatly reducing the head resistance of the chassis. As pointed out hereinbefore the wheels and shock absorbers are easily removable and replaceable without disturbing the chassis frame in any way, this being a great advantage over previous chassis of a somewhat similar type. Also the chassis is supported from the fuselage alone and since it has no connection with the wings a breakage of the chassis, due to any cause, would not affect the strength of the wings in any way.

While the forms of mechanism herein shown and described constitute preferred forms of embodiment of the present invention, it is to be understood that other forms might be adopted, all coming within the scope of the claims which follow.

What I claim is as follows:

1. In a landing gear for airplanes, in combination, right and left V-struts pivoted to the right and left sides respectively of the fuselage, right and left wheel axles each having a slidable connection to the lower part of its respective V-strut and pivoted at its other end to the opposite side of the fuselage.

2. In a landing gear for airplanes, in combination, right and left V-struts pivoted to a rigid part of the machine, right and left wheel axles each having a slidable connection to the lower part of its respective V-strut and pivoted to a rigid part of the machine in such manner that said axles cross each other.

3. In a landing chassis, a wheel support, comprising a substantially V-shaped strut pivoted to the fuselage adjacent one side thereof and a bent wheel axle pivoted to the fuselage adjacent the other side thereof, the wheel axle being resiliently attached to the V-strut.

4. In a landing chassis, a wheel support, comprising a substantially V-shaped strut pivoted to the fuselage adjacent one side thereof and a bent wheel axle pivoted to the fuselage adjacent the other side thereof, the wheel axle being resiliently attached to the V-strut on the inner side of the wheel, whereby the wheel may be easily detached from the axle.

5. In a landing chassis having a wheel, axle, shock absorber, and a guide support for said axle; a guide block for taking the bearing pressure between the axle and guide support, and means for removing said guide block for replacement, without removing the shock absorber or wheel.

In testimony whereof I hereto affix my signature.

V. E. CLARK.